J. L. HILLER.
UNIVERSAL BEARING.
APPLICATION FILED SEPT. 25, 1915.
1,209,295.
Patented Dec. 19, 1916.
2 SHEETS—SHEET 1.
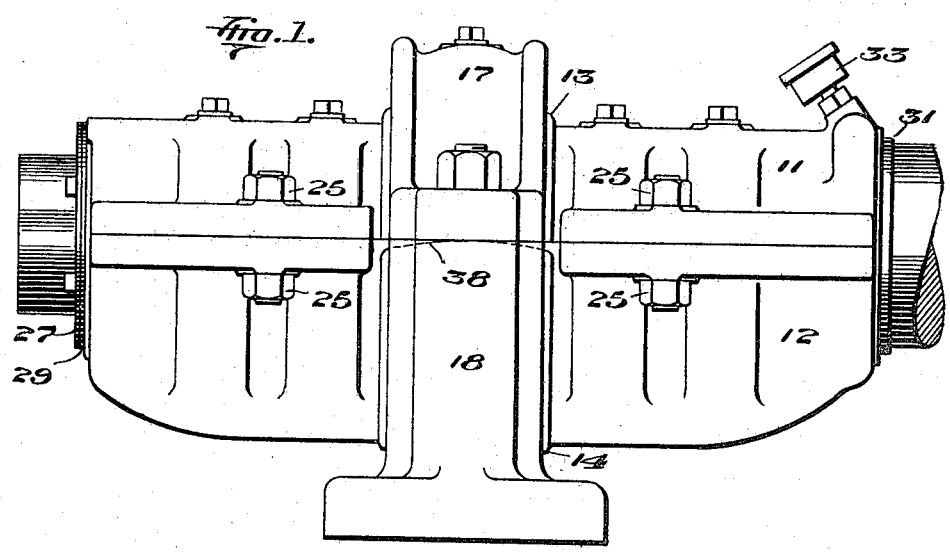
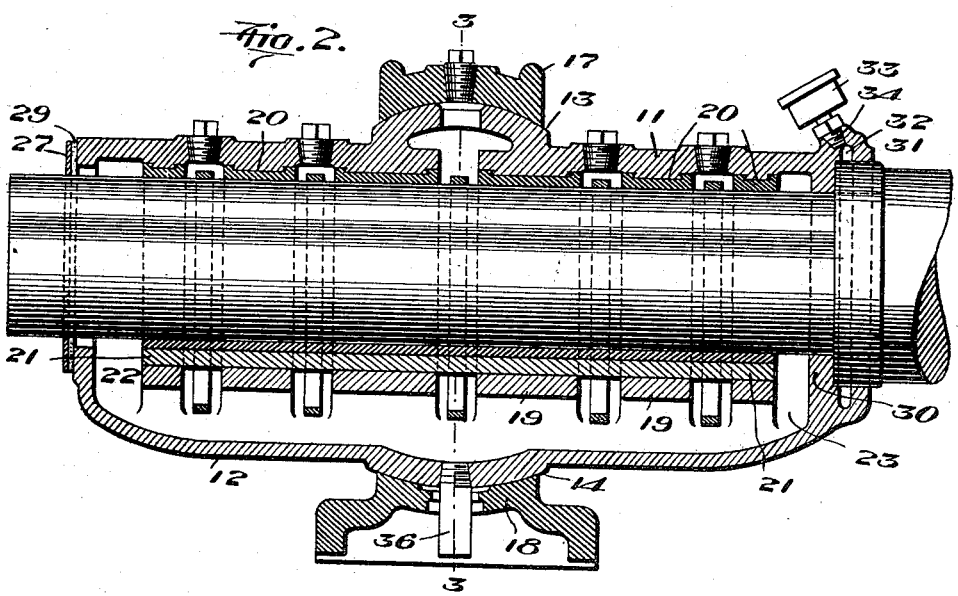
Witnesses
Philip E. Barnes
J.J. Mawhinney
Inventor
Joseph L. Hiller
By Meyers Cushman Rea
Attorney J. L. HILLER.
UNIVERSAL BEARING.
APPLICATION FILED SEPT. 25, 1915.
1,209,295.
Patented Dec. 19, 1916.
2 SHEETS—SHEET 2.
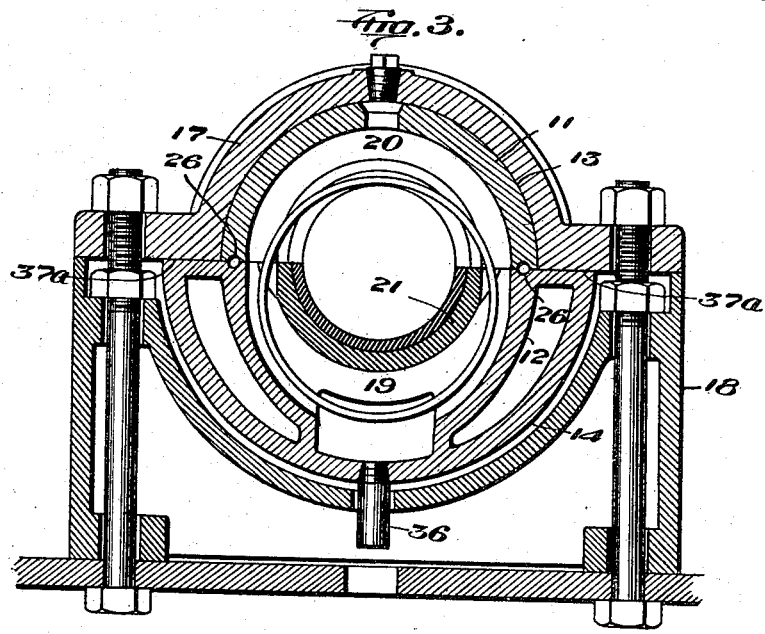
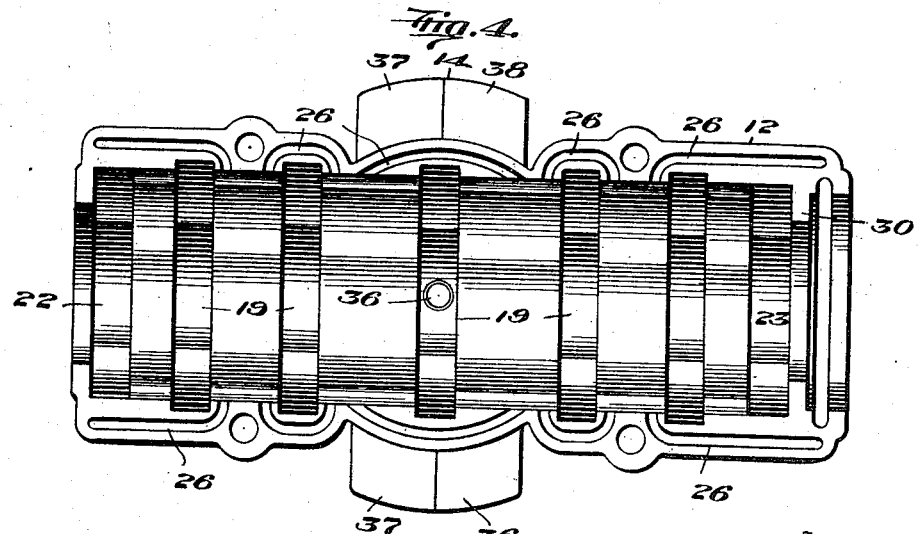
Inventor
Joseph L. Hiller

UNITED STATES PATENT OFFICE.

JOSEPH L. HILLER, OF MATTAPOISETT, MASSACHUSETTS.

UNIVERSAL BEARING.

1,209,295.   Specification of Letters Patent.   Patented Dec. 19, 1916.

Original application filed January 25, 1911, Serial No. 604,621. Divided and this application filed September 25, 1915. Serial No. 52,663.

*To all whom it may concern:*

Be it known that I, JOSEPH L. HILLER, a citizen of the United States, residing at Mattapoisett, in the county of Plymouth and State of Massachusetts, have invented new and useful Improvements in Universal Bearings, of which the following is a specification.

This invention relates to an improvement in bearings, is a division of application, Ser. No. 604,621, filed January 25, 1911, and has particular reference to the rocking or universal adjustment of the bearing.

It is an object of the present invention to provide a bearing capable of doing heavy work at high speed; for use under unfavorable working conditions where careless attendance prevails; which is capable of universal adjustment; which provides a practically continuous contacting support around the members to give the bearing ample support both horizontally and angularly as well as vertically; which embraces all of these features, and at the same time, provides an uninterrupted oil well extending from end to end in the bottom of the bearing without sacrificing to any extent the thorough support essential in a machine which develops stresses in all directions transverse to the axis of the shaft supported, and wherein the principal parts are held within the support from rotative displacement about the longitudinal axis of the bearing.

Other objects and advantages of this invention will be brought out in the following detail description of one embodiment thereof, the same being illustrated in the accompanying drawings, wherein—

Figure 1 is a side elevation of the bearing and its support. Fig. 2 is a longitudinal vertical section of the same, showing the shaft in place in the bearing. Fig. 3 is a transverse section taken centrally through the bearing on the line 3—3 of Fig. 2. Fig. 4 is a top plan view of the lower half or principal part of the bearing.

The body of the bearing comprises two halves or principal parts 11 and 12. These parts or sections of the bearing are provided respectively with ball or spherical surfaces 13 and 14 intermediate their ends adapted to bear on corresponding surfaces formed in a bearing cap 17 and a bearing support or pillow block 18. The body of the bearing is of considerably greater length than the width of the cap and pillow block, the ends of the bearing projecting a considerable distance on each side of the support 18 to provide for a relatively large bearing surface. The cap 17 is suitably bolted or otherwise detachably secured to the block 18 as disclosed in Figs. 1 and 3. By virtue of the ball and socket thus provided, the body of the bearing may move within the support in response to abnormal strain and normal flexing of the shaft.

Instead of making the radius of the spherical surfaces 13 and 14 of the bearings of the same radius as is usual, the surface 14 of the lower half or part of the bearing is formed on a larger radius, although the surfaces 13 and 14 are concentric with each other. The lower half 12 of the body of the bearing is correspondingly enlarged at its middle portion and is given greater depth than the upper section of the body 11 as clearly shown in Fig. 3.

The body of the bearing may be provided with any suitable bearing surface, for instance, as it is shown in the drawings wherein ribs 19 are formed transversely in the member 12, and ribs 20 are formed on the member 11. The ribs 19 are spaced above the bottom of the section 12 to provide for an uninterrupted passage or chamber extending from end to end of the member 12 in the extreme lower part thereof to provide an oil chamber or well admitting of the free flow of oil throughout the length of the bearing. A liner 21 semi-circular in cross-section is supported upon the ribs 19 in the lower part of the bearing, the liner extending practically throughout the entire length of the bearing and being adapted to be babbitted for the reception of the shaft. The continuous oil chamber in the bottom of the section 12 opens at its opposite ends into spaces 22 and 23 formed by interiorly enlarging the members 11 and 12. The ribs 19 and 20 respectively of the upper and lower sections of the bearing register and provide vertical spaces therebetween for the reception of solid oil rings adapted to rest on the shaft and to dip into the continuous oil chamber in the bottom of the bearing.

The two main sections or halves 11 and 12 of the bearing are secured together by bolts 25. These sections 11 and 12 are also provided in their abutting faces or edges with longitudinal oil grooves 26 opening to the interior of the bearing as shown in Fig. 4 to return to the interior of the bearing any oil seeping through the crevices formed between the sections. The outer end of the bearing is closed by a plate 27 between which and the bearing is interposed a packing ring 29. The inner or opposite end of the bearing is closed by an interior flange 30 engaging a collar 31 on the shaft. Beyond the flange the sections are provided with an interior groove 32, to which grease is supplied by a grease cup 33 through a channel 34. This construction not only serves as a closure for the inner end of the bearing, but also provides for a thrust bearing between the shoulder or flange 30 and the collar 31. The grease in the groove 32 also serves to seal the collar 31 in the end of the bearing.

The floor of the oil chamber or reservoir tapers to a draining portion or well, which draining portion may, of course, be disposed at any point convenient or desirable, it being shown in the present instance as located at the middle of the bearing, although I do not confine myself to that specific location, and a drainage passageway 36 is formed in the bottom of the bearing, which passageway passes down through the support 18. In this manner the oil reservoir or chamber may be completely drained and foreign substances collecting in the bearing be removed. As the lower half 12 of the bearing is of larger radius than the upper half 11, the liner is held from rotating by engagement of its upper edges with the lower edges of the ribs 20 of the upper half 11 and the entire body of the bearing is held from rotation as a whole in the support 18 by the cap 17 as the edges 37ª of the lower half 12 project laterally beyond the edges of the upper half 11. These laterally projecting edges are engaged by the lower faces of the cap 17 and rotation of the bearing can not take place. However, the bearing is free to move about the ball and socket as a center, there being no hindrance to this movement since the spherical ball surfaces 13 and 14 are formed from the same center, which center is on the axis line of the shaft. In order to prevent possible interference from the lower faces of the cap 17, the top surfaces 38 of the member 12 are sloped downwardly and outwardly from a central line to provide a fulcrum or pivotal support for the lower section 12 of the bearing against the cap 17. There is thus no interference when oscillation of the bearing takes place in a vertical plane. The lower edges of the cap 17 might be so curved or beveled instead of the projecting portions 37ª of the lower half 12.

From this construction, it will be noted that the bearing is in continuous contact at all points within the socket, so that the bearing is supported against stresses exerted in any angle, and at the same time the construction is such that this continuous support of the main sections of the bearing does not interrupt the continuous oil chamber or reservoir extending in a straight line from end to end of the bearing, and does not interrupt the draining passage which leads from the lowermost intermediate or middle portion of the bearing.

I claim:

1. A ball and socket bearing comprising upper and lower parts, and a socket for the bearing comprising upper and lower parts, the bearing and socket surfaces having complemental ball surfaces, the ball surface of the lower part being formed on a larger radius than the ball surface of the upper part.

2. A ball and socket bearing comprising two parts having ball portions, the ball portion of one part being formed on a larger radius than the ball portion of the other part.

3. A ball and socket bearing comprising upper and lower parts each provided with ball portions, the ball portion of the lower part being formed on a larger radius than the ball portion of the upper part.

4. A ball and socket bearing comprising upper and lower parts provided with ball portions, the lower ball portion having a bearing surface continuous throughout its length and being provided below such bearing surface with a continuous unbroken oil-well from end to end thereof.

5. A ball and socket bearing comprising upper and lower parts provided with ball portions, the lower part being provided with a plurality of supporting ribs, a bearing member on said ribs on which said shaft rests, and an oil well in said lower part beneath said ribs and said supporting member.

6. A ball and socket bearing comprising upper and lower parts each provided with ball portions, the lower ball portion sloping from its ends to a draining portion, and having a continuous unbroken oil well extending throughout the length thereof.

7. A ball and socket bearing comprising an upper part and a relatively deep lower part, the bottom of which relatively deep lower ball portion slopes from its ends to a draining portion, and having a continuous uninterrupted oil well extending throughout the length thereof.

8. A ball and socket bearing comprising upper and lower parts each provided with ball portions, the ball portion of the lower part being formed on a larger radius than the ball portion of the upper part, the lower part of the bearing having an oil well extending the full length of the bearing and being open throughout its length.

9. A ball and socket bearing comprising upper and lower parts each provided with ball portions, the ball portion of the lower part being formed on a larger radius than the ball portion of the upper part, an interior oil well extending the full length of the bearing and tapering from each end toward the middle of the said lower part, and a drainage outlet therefor.

10. A ball and socket bearing comprising upper and lower parts, the said parts being of different widths measured in the plane of their division whereby a shoulder is formed on one side of said bearing, and a socket for holding the bearing and having a complemental engaging shoulder.

11. A ball and socket bearing comprising upper and lower parts each provided with ball portions, the ball portion of the lower part being formed on a larger radius than the ball portion of the upper part, the lower part having an interior oil well extending throughout its entire length and provided with a depression midway of its ends forming the lower ball portion, said lower ball portion having a drainage passage at its lowermost point.

12. A journal box or bearing comprising two parts separable in a plane through the journal axis of the bearing, a spherically curved bearing surface on each of said parts, said surfaces having a common center with radii of different lengths, and a two part socket fitted to said spherical surfaces in which the journal box is adapted to rock, the smaller of said socket parts overlying the projecting ends of the larger spherical surfaces in said plane of division of the journal box.

13. A journal box or bearing comprising an upper and a lower part divided in a plane through the journal axis of the bearing, a spherically curved bearing surface on the upper part, a similarly curved bearing surface on its lower part, the radius of which is greater than that of the upper part, the center of said curved surfaces being coincident with each other and said journal axis, a stationary socketed support for the greater curved surface, and a socketed cap piece for said support fitted to the lesser curved surface and bearing on the projecting parts of the greater curved portion to prevent rotation of the journal box.

14. A journal box or bearing comprising an upper part, and a lower part separable in a plane, a hemispherical bearing surface on each of said parts intermediate its ends, the spherical bearing surface on the lower part being of greater radius than that on the upper part, so as to project beyond or overlap the same in the plane of separation, a spherical socket bearing in which fits the lower part of the box, and a cap for said socket bearing fitted to the upper part of the box, said cap having lateral portions thereon for securing it to the socket bearing which portions also bear on the projecting parts of the larger hemispherical bearing surface and prevent rotation of the journal box.

15. A journal box or bearing comprising an upper and a lower part, a hemispherical bearing surface on each of said parts, the extreme width of the lower hemispherical bearing in the plane of separation between said bearings being greater than the width of the upper surface, a socket for the greater hemispherical bearing surface, and a socket cap for the lesser hemispherical surface, said socket cap bearing on said greater bearing surface in the plane of separation to prevent rotation of the journal box.

16. A journal box or bearing comprising upper and lower parts separable in a plane through the journal axis of the bearing, said parts each having a spherically curved surface intermediate its ends of different diameters whereby a shoulder is formed on one side of said bearing, and a socket for holding the journal box provided with a complemental engaging shoulder.

In testimony whereof I have hereunto set my hand in presence of two subscribing witnesses.

JOSEPH L. HILLER.

Witnesses:
FLORENCE L. HILLER,
J. F. CULLEN.

Copies of this patent may be obtained for five cents each, by addressing the "Commissioner of Patents, Washington, D. C."